United States Patent [19]
Demorest

[11] Patent Number: 4,653,623
[45] Date of Patent: Mar. 31, 1987

[54] SNUBBER MECHANISM FOR RATCHET-TYPE SLIP CLUTCH

[75] Inventor: Donald W. Demorest, Ottumwa, Iowa

[73] Assignee: Deere & Company, Moline, Ill.

[21] Appl. No.: 756,130

[22] Filed: Jul. 18, 1985

[51] Int. Cl.$^4$ .................. F16D 7/00; F16D 13/14; F16D 43/20
[52] U.S. Cl. .................. 192/56 R; 192/71; 464/37
[58] Field of Search .......... 192/56 R, 71; 464/37, 464/38, 42, 43, 44

[56] References Cited
U.S. PATENT DOCUMENTS

| 1,865,559 | 7/1932 | De Montgrand | 464/37 X |
| 2,633,215 | 3/1953 | Battaline | 192/56 R |
| 2,909,047 | 10/1959 | Walterschied-Muller et al. | 464/37 |
| 3,754,412 | 8/1973 | Briggs | 192/56 R X |
| 4,417,650 | 11/1983 | Geisthoff | 192/56 R |
| 4,566,570 | 1/1986 | Geisthoff | 192/56 R |

FOREIGN PATENT DOCUMENTS

| 222441 | 7/1962 | Austria | 464/37 |
| 1183748 | 12/1964 | Fed. Rep. of Germany | 192/56 R |

Primary Examiner—Rodney H. Bonck

[57] ABSTRACT

Torque is normally transmitted between driving and driven members of a ratchet-type slip clutch by a plurality of equiangularly disposed banks of radial pins reciprocably mounted in a cylindrical hub of the driving member and normally spring biased into the bottom of a plurality of equiangularly disposed pockets located in a cylindrical shell of the driven member. Located so as to cooperate to operate completely out of phase relative to the operation of the pins and associated pockets for transmitting torque during normal operation of the clutch so as to maintain positive torque transfer during slipping operation of the clutch is a snubbing mechanism comprising a further set of pins reciprocably mounted in the cylindrical hub and having associated pockets located in the cylindrical shell.

7 Claims, 7 Drawing Figures

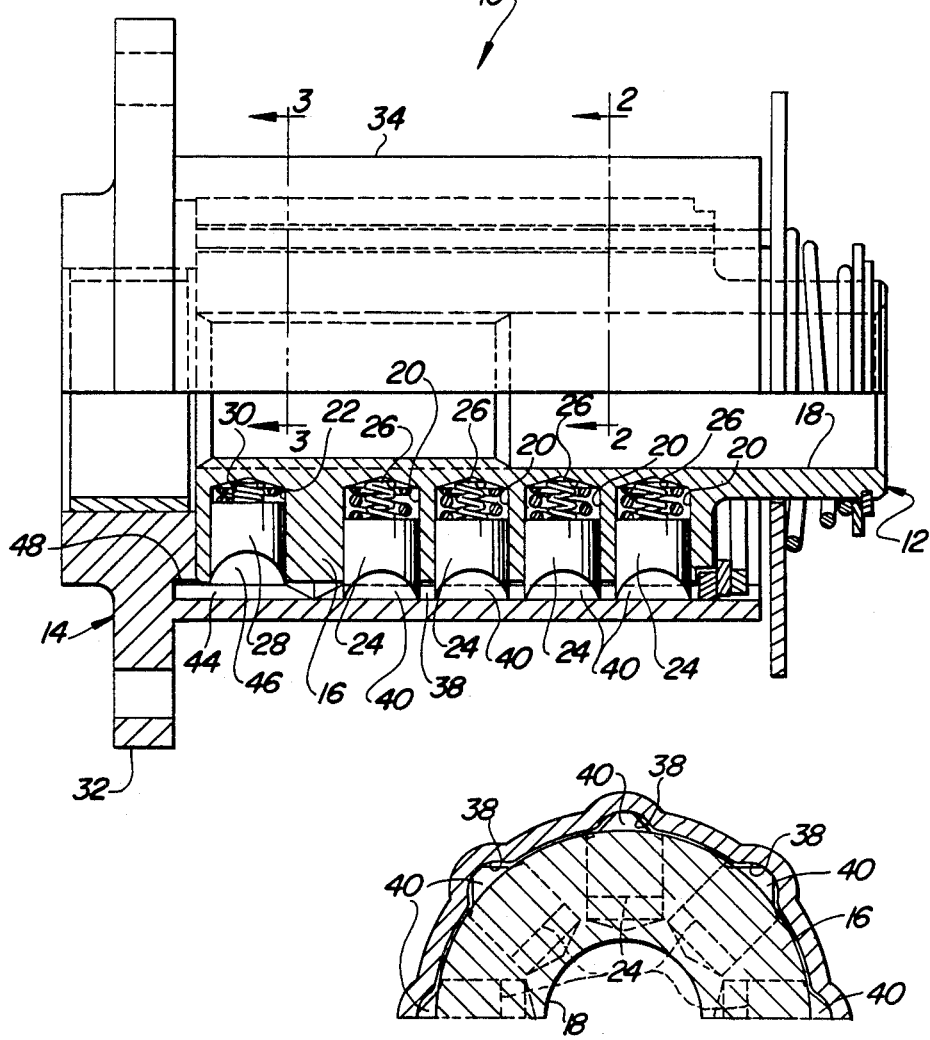
Fig. 1
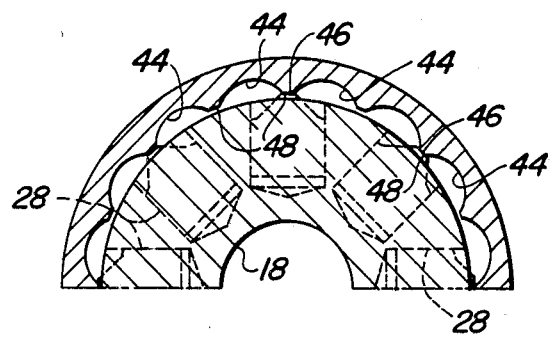
Fig. 2
Fig. 3

SNUBBER MECHANISM FOR RATCHET-TYPE SLIP CLUTCH

BACKGROUND OF THE INVENTION

The present invention relates to slip clutches and more particularly relates to ratchet-type slip clutches including spring-loaded pin or ball elements mounted in one clutch part and biased into engagement with recesses formed in another clutch part.

Known ratchet-type torque limiting clutches that use spring-loaded pins or balls as torque transferring elements operate such that when these elements slip due to an overload, the drive and driven components rapidly unwind and undergo a hammering action which is detrimental to them. During a slipping sequence of a known radial pin ratchet-type slip clutch, negative torque peaks were observed which were fifty percent or more of the positive slipping torque.

SUMMARY OF THE INVENTION

According to the present invention there is provided an improved ratchet-type slip clutch using pin or ball elements resiliently biased into recesses for accomplishing torque transfer through the clutch.

An object of the invention is to provide a ratchet-type slip clutch which operates during its slipping mode such that no negative torque excursions occur or if any occur they are small in magnitude.

A more specific object of the invention is to provide a ratchet-type clutch which includes snubbing elements which are located so as to operate out of phase relative to primary torque transferring elements so that when the latter are in a slip mode the snubbing elements operate to maintain a positive or nearly positive torque transfer between clutch components.

These and other objects, features and advantages of the present invention will become apparent to those skilled in the art from the description which follows and from the drawings.

BRIEF DESCRIPTION OF THE DRAWINGS

FIG. 1 is a view partially in side elevation and partially in axial section of a slip clutch constructed in accordance with the present invention so as to include a snubber section joined to one end of a primary torque transferring section with a single bank of snubber pins being associated with pockets located out of phase relative to pockets associated with a plurality of banks of primary pins.

FIG. 2 is a vertical sectional view taken along line 2—2 of FIG. 1 and showing one of the banks of primary pins in extended, torque transmitting positions in associated pockets.

FIG. 3 is a vertical sectional view taken along line 3—3 of FIG. 1 and showing the banks of snubbing pins located in retracted non-snubbing positions between associated pockets.

DESCRIPTION OF THE PREFERRED EMBODIMENT

Figure 4:
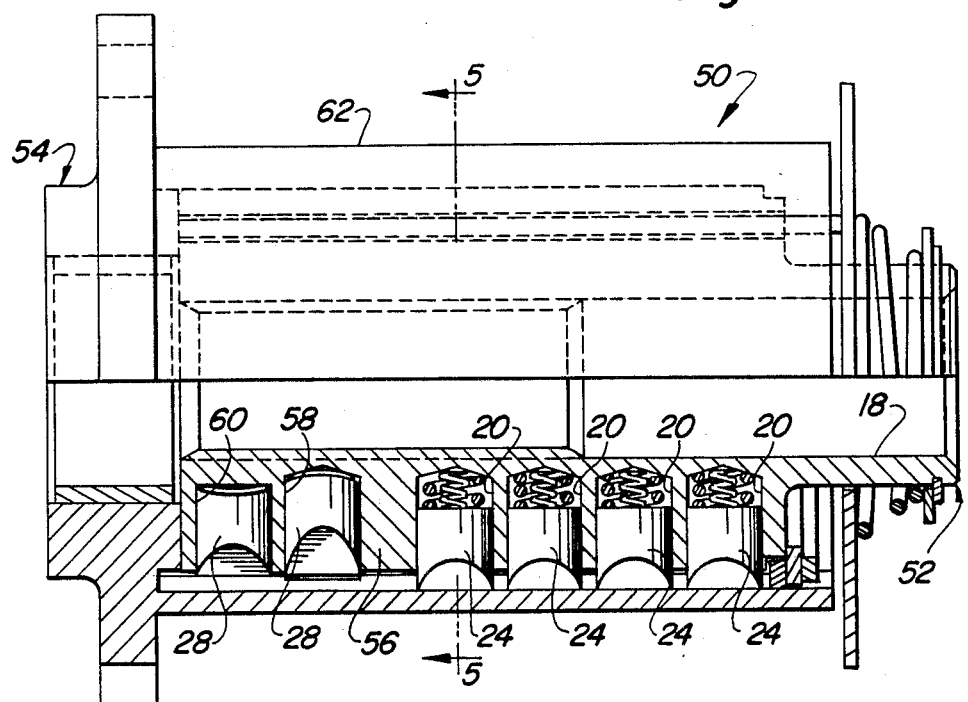
FIG. 4 is a view like FIG. 1 but showing an alternate embodiment wherein one set of pockets is provided for engagement by both the primary and snubbing pins and wherein two banks of snubbing pins are provided with the banks being located out of phase relative to each other and to the banks of primary pins.

Referring to FIGS. 1-3, there is shown a slip clutch 10, of the ratchet type, including a driving member 12 and a driven member 14. The driving member 12 is in the form of a cylindrical hub 16 having an axial mounting bore 18 provided with internal splines (not shown) adapted for being received on a splined drive shaft. Four axially aligned banks of eight equiangularly spaced radial blind bores 20 are equally spaced axially along the length of the hub 16 and a fifth bank of eight equiangularly spaced radial blind bores 22 are spaced axially from and axially aligned with an end bank of the bores 20. Received in each blind bore 20 is a main torque transmitting or primary pin 24 having its inner end engaged with a coil compression spring 26 seated in the bottom of the bore. Similarly, received in each blind bore 22 is a snubbing pin 28 having its inner end engaged with a coil compression spring 30 seated in the bottom of the bore.

The driven member 14 comprises a circular mounting flange 32 welded to one end of a substantially cylindrical shell 34 which receives the hub 16 of the driving member 12. The shell 34 includes a relatively long section encompassing the primary pins 24 and having eight pockets or recesses 38, of arcuate cross section, formed lengthwise in the interior thereof at equiangularly spaced locations and respectively receiving tapered outer ends 40 of the eight primary pins 24 of each of the first four banks of pins when the clutch is operating in a nonslipping mode. The shell 34 further includes a short section encompassing the snubbing pins 28 and having sixteen recesses 44 of arcuate cross section formed lengthwise in the interior thereof at equiangularly spaced locations, with a pair of the recesses being respectively equiangularly offset from opposite sides of each recess 38 by 11.5 degrees. Tapered outer ends 46 of the snubbing pins 28 are respectively engaged with surfaces 48 located between adjacent recesses 38 when the clutch is in the nonslipping mode. The recesses 38 and 44 are each symmetrical to a radial plane passing through the bottom thereof so that the clutch operates the same in forward and reverse drive modes.

Figure 5:
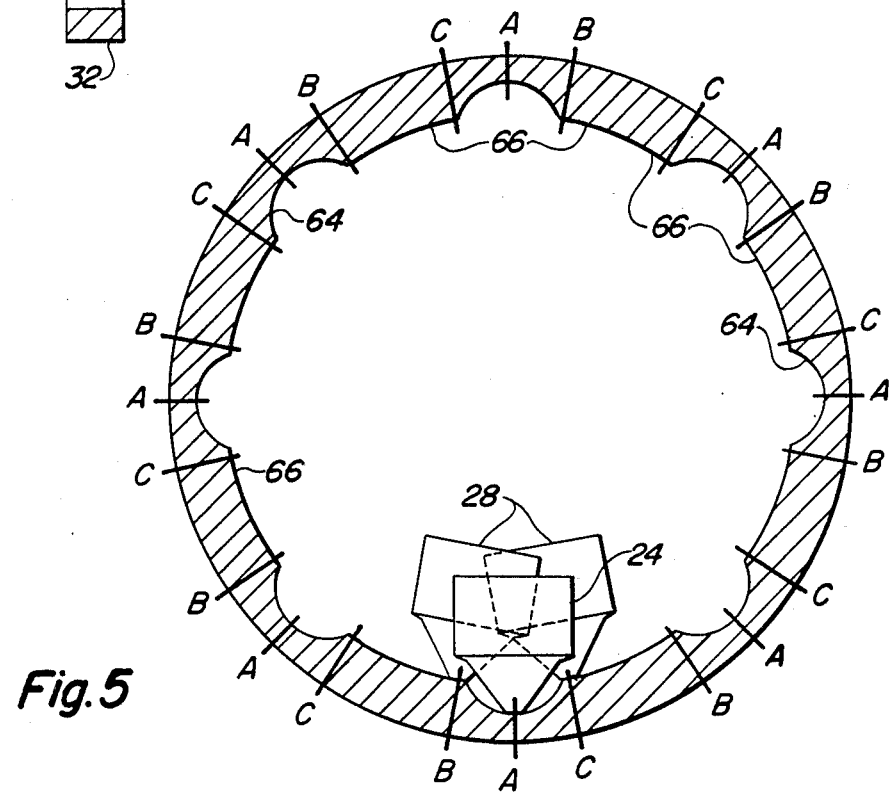
FIG. 5 is an enlarged vertical sectional view taken along line 5—5 of FIG. 4 but, for the sake of clarity omitting the hub and all but one pin of one bank of primary pins and each of the two banks of snubbing pins so as to show the angular relationship between these banks of pins.

Referring now to FIGS. 4 and 5, there is shown an alternate embodiment of the invention, with parts like those of the previously described embodiment being assigned like reference numerals. Specifically, shown is a slip clutch 50 including a driving member 52 and a driven member 54. The driving member 52 is in the form of a cylindrical hub 56 having an axial mounting bore 18 provided with internal splines (not shown) adapted for being received on a splined drive shaft. Four axially aligned banks of eight equiangularly spaced radial blind bores 20 are equally spaced axially along the length of the hub 56. A fifth bank of eight equiangularly spaced radial blind bores 58 are offset angularly 11.5 degrees in a first direction relative to the four banks of bores 20 and a sixth bank of eight equiangularly spaced radial bores 60 are offset angularly 11.5 degrees in a second direction relative to the four banks of bores 20. The bores 20 respectively contain primary pins 24 and springs 26, while each of the banks of bores 58 and 60 contains one of the pins 28 and one of the springs 30. The positions of the unshown primary pins 24 in FIG. 5 are indicated by the letter A while the letters B and C indicate the positions of the unshown snubbing pins 28 respectively of the banks of bores 58 and 60.

The driven member 54 comprises the circular mounting flange 32 joined to one end of a cylindrical shell 62 which receives the hub 56 of the driving member 52. The interior of the shell 62 is provided with eight equiangularly located pockets or recesses 64, which are arcuate in cross section, symmetrical to a radial plane passing through the bottom thereof and joined by surfaces 66. When the clutch 50 is in a nonslipping mode, as illustrated, the primary pins 24 will be seated in the pockets 64 while the snubbing pins 28 of the fifth bank of pins will respectively be seated against one end portion of each of the surfaces 66 and the snubbing pins 28 of the sixth bank of pins will respectively be seated against another end portion of each of the surfaces 66. Thus, it will be appreciated that engaged with respective surfaces 66 at the opposite sides of a given pocket 64 will be one of the snubbing pins 28 from the fifth bank of pins and one of the snubbing pins 28 from the sixth bank of pins. This embodiment has the advantage over the FIG. 1 embodiment that the cylindrical shell of the driven member may be provided with uniform pockets that extend the full length of the shell thus making it simpler to manufacture.

It is to be noted that while each of the disclosed embodiments includes four banks of eight primary pins each, that other numbers of banks and/or pins per bank may be used depending on the amount of torque to be transferred during ordinary operation of the clutch. Also, while pins are shown as being the torque transmitting and snubbing elements, other elements such as balls, for example, could be used. Additionally, the invention could be applied to slip clutches constructed such that their primary and snubbing elements extend axially instead of radially.

The respective embodiments of FIGS. 1 and 4 are similar in operation. Specifically, when the torque resistance in a drive train incorporating either the clutch 10 or the clutch 50 exceeds the capacity of the clutches, their primary pins 24 will be cammed radially inwardly from the pockets associated therewith so as to permit the driving and driven members to slip relative to each other, with the pins 24 reciprocating into and out of the pockets. At the time that the primary pins 24 move radially inwardly from an associated pocket, the snubbing pins 28 will be biased to extend radially into an associated pocket and in this way apply sufficient resistance between the driving and driven members so as to prevent the driving and driven members and their respective associated shafts from rapidly unwinding such as to cause negative torque spikes which are detrimental to drive and driven shafts, chains and other drive components. Preferably, the snubbing pins 28 will maintain enough resistance to relative rotation between the driving and driven members that a positive torque transfer between the members is always present.

Figure 6:
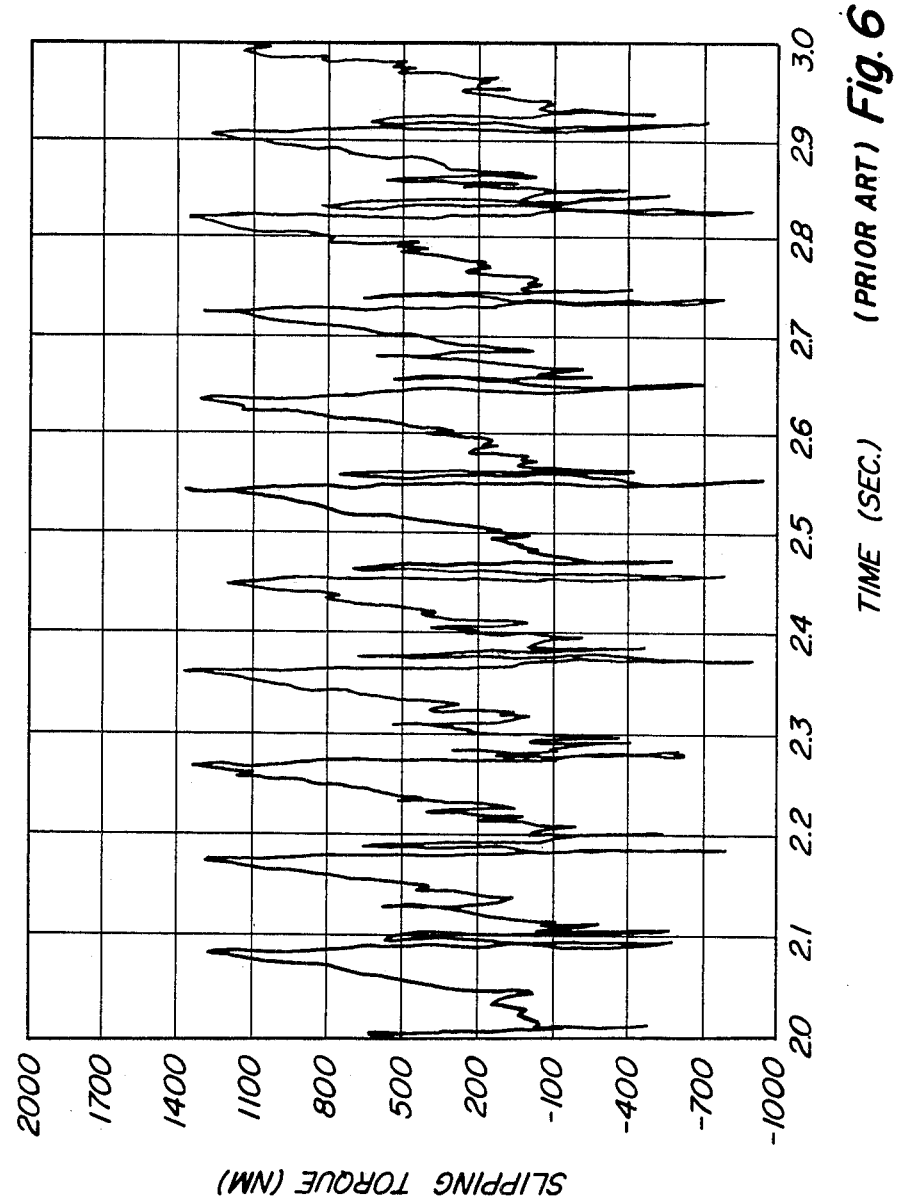
FIG. 6 is a view showing a graph illustrating the torque characteristics of a prior art slip clutch, like the slip clutch of FIG. 1 absent the snubbing section, during slipping operation of the latter.
Figure 7:
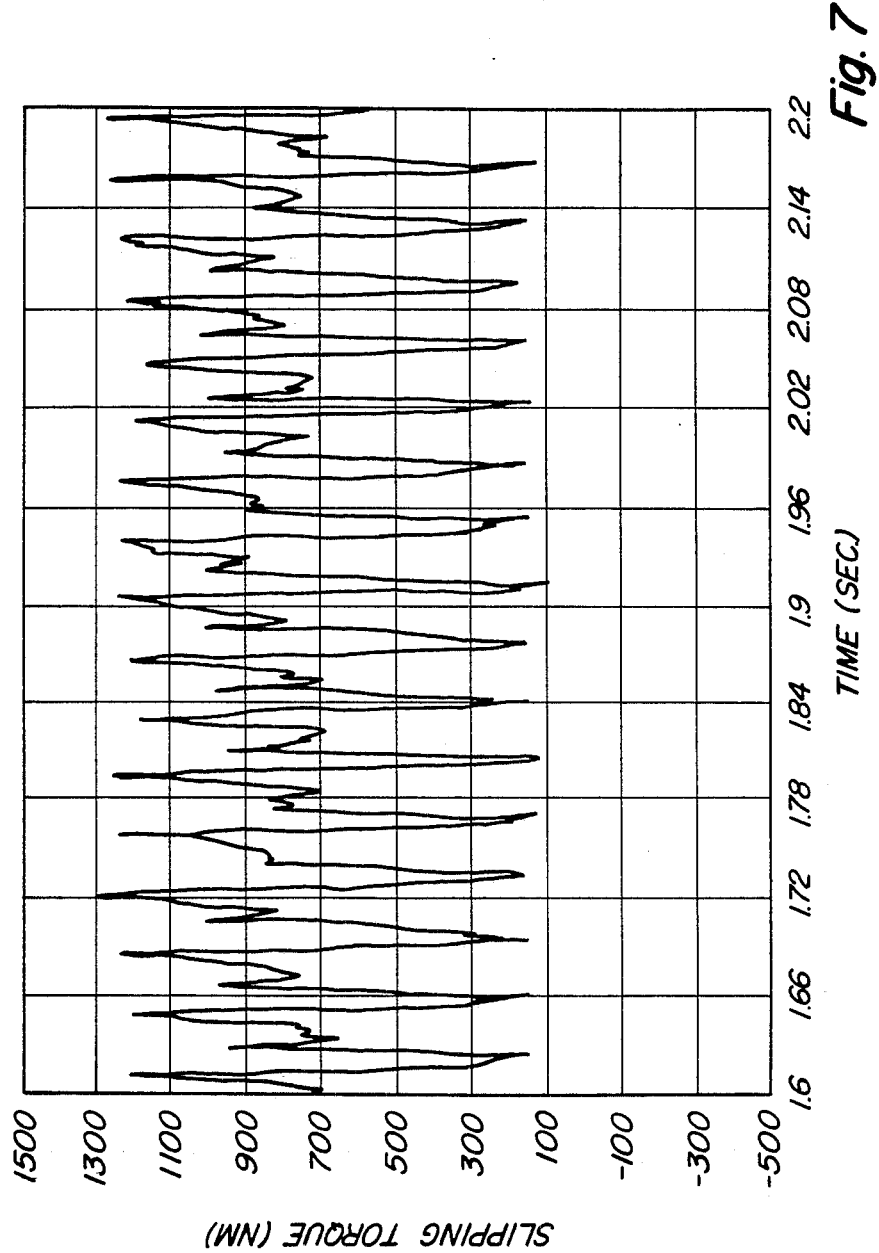
FIG. 7 is a view showing a graph illustrating the torque characteristics of a slip clutch constructed in accordance with the slip clutch illustrated in FIG. 1.

Referring to FIG. 6, there is a graph depicting a torque history taken of a prior art slip clutch, a clutch like that shown in FIG. 1 but omitting the snubbing pins and associated pockets during slipping operation. The positive torque spikes shown by the graph are the points where the pins slip from their respective pockets with the negative spikes indicating the release of the "windup" in the drive train components on opposite sides of the clutch. The maximum slipping torque is approximately 1400 NM while the minimum slipping torque is approximately −950 NM or a negative value more than sixty-five percent of the positive value. It takes only about 0.026 seconds for the torque to go from maximum to minimum torque values and this rapid cycling of the drive components between positive and negative values results in hammering or shock loading between parts such as splines, gear teeth and the like.

In contrast, FIG. 9 shows a graph of the torque history of a slip clutch like that shown in FIG. 1 during slipping operation. It can be seen that the snubbing pins and associated pockets of this clutch have resulted in a maximum value of about 1300 NM and a minimum value of about 100 NM. Thus, there is always a positive slipping torque transfer between the driving and driven members resulting in the drive components always being loaded in the normal direction of travel which reduces impact cycles or shock loading between the various drive and driven components.

Furthermore, the torque fluctuation which the improved clutch undergoes during slipping has a magnitude of 1200 NM while that which the clutch of the prior art undergoes is 2350 NM. This much shorter range of torque fluctuation results in a much greater fatigue life for the parts of the drive train incorporating the improved clutch.

I claim:

1. In a slip clutch including a cylindrical driving hub located along an axis of rotation and received within a cylindrical driven shell, a plurality of primary torque transmitting pins reciprocably mounted in the hub for radial movement and being arranged for forming at least two axially spaced banks of equiangularly spaced pins, a first set of equiangularly spaced recesses located in the shell for receiving the primary torque transmitting pins and a first set of spring means respectively acting on the primary torque transmitting pins and resiliently biasing them toward the shell, the improvement comprising:

the pins of one of said two banks being equal in number to and being angularly aligned with the pins of another of said two banks, said first set of equiangularly spaced recesses being located for simultaneously receiving all of the primary torque transmitting pins when the clutch is in a normal nonslipping mode;

a snubbing means acting between the hub and shell for maintaining at least a nearly positive torque transfer between the hub and shell when the clutch is operating in a slipping mode;

said snubbing means including a plurality of snubbing pins reciprocably mounted in the hub for radial movement and being disposed equiangularly about the hub;

a second set of equiangularly spaced recesses arranged for receiving said snubbing pins during a slipping mode of the clutch;

a second set of spring means respectively acting on the snubbing pins and resiliently biasing them toward the shell, and said snubbing pins and second set of equiangularly spaced recesses being so disposed relative to each other and to the primary torque transmitting pins and first set of equiangularly spaced recesses such that at least some of the snubbing pins, but no more than a number equal to half of the number of primary torque transmitting pins, will be engaged with respective bottoms of some of the second set of recesses when the primary torque transmitting pins are substantially completely removed from the first set of recesses.

2. The slip clutch defined in claim 1 wherein said plurality of snubbing pins equal the number of primary torque transmitting pins located in each of said at least two banks, are all located in a single bank and are angularly offset half way between the angular location of the pins of each of the two banks.

3. The slip clutch defined in claim 2 wherein the primary torque transmitting pins are arranged in four banks of eight pins each.

4. The slip clutch defined in claim 1 wherein said plurality of snubbing pins are equally divided between and arranged in a pair of banks with the pins of one of the pair banks being angularly offset from the pins of another of the pair of banks and from the pins located in each of said at least two banks of primary torque transmitting pins.

5. The slip clutch defined in claim 4 wherein each of the banks of primary torque transmitting pins and each of the banks of snubbing pins contains eight pins.

6. The slip clutch defined in claim 4 wherein the first and second sets of recesses are each equal in number to the number of pins in each bank and both sets are formed by continuous recesses extending axially in the shell.

7. The slip clutch defined in claim 1 wherein each recess of the first and second sets of recesses are shaped symmetrically relative to radial planes respectively passing through the bottoms of each recess whereby the slip clutch operates equally in forward and reverse drive modes.

* * * * *